(12) United States Patent
Baldwin et al.

(10) Patent No.: US 9,385,946 B2
(45) Date of Patent: Jul. 5, 2016

(54) NETWORK-BASED CONTENT FILTERING UTILIZING USER-SPECIFIED PARAMETERS

(75) Inventors: Christopher Baldwin, Crystal Lake, IL (US); Bruce Barnes, Pingree Grove, IL (US); Wayne Robert Heinmiller, Elgin, IL (US); Patrick Kenny, Barrington, IL (US); Shadi Khoshaba, Skokie, IL (US); Dolores J. Mallian, St. Charles, IL (US); Nikhil Shreerang Marathe, Roselle, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 526 days.

(21) Appl. No.: 13/559,247

(22) Filed: Jul. 26, 2012

(65) Prior Publication Data

US 2014/0029615 A1    Jan. 30, 2014

(51) Int. Cl.
| | | |
|---|---|---|
| *H04L 12/28* | (2006.01) | |
| *G06F 15/16* | (2006.01) | |
| *H04L 12/725* | (2013.01) | |
| *H04L 29/08* | (2006.01) | |

(52) U.S. Cl.
CPC ............ *H04L 45/306* (2013.01); *H04L 45/308* (2013.01); *H04L 67/2828* (2013.01); *H04L 67/306* (2013.01)

(58) Field of Classification Search
CPC .............. H04L 67/327; H04L 12/1886; H04L 12/1859; H04L 12/1895; H04L 67/28; H04L 63/0245; H04L 63/145; G06F 21/564; G06F 13/12; G06F 21/85; G06F 17/30867
See application file for complete search history.

(56) References Cited

U.S. PATENT DOCUMENTS

| | | | |
|---|---|---|---|
| 7,035,628 B2 | 4/2006 | Rindsberg et al. | |
| 7,293,017 B2 | 11/2007 | Hurst-Hiller et al. | |
| 7,698,720 B2 | 4/2010 | Matz | |
| 7,711,669 B1 * | 5/2010 | Liu et al. .......................... | 706/45 |
| 7,971,250 B2 | 6/2011 | Walter | |
| 8,099,457 B2 * | 1/2012 | Lowery et al. ................ | 709/203 |
| 8,230,149 B1 * | 7/2012 | Long et al. .................... | 710/305 |
| 2004/0001498 A1 * | 1/2004 | Chen et al. .................... | 370/401 |
| 2004/0064537 A1 * | 4/2004 | Anderson et al. ............. | 709/223 |
| 2006/0089969 A1 * | 4/2006 | Brown et al. .................. | 709/203 |
| 2010/0015956 A1 | 1/2010 | Qu et al. | |
| 2010/0082811 A1 * | 4/2010 | Van Der Merwe et al. ... | 709/225 |
| 2010/0332507 A1 | 12/2010 | Saadat | |
| 2011/0264804 A1 | 10/2011 | Vuksan et al. | |
| 2012/0136965 A1 | 5/2012 | Matz | |

OTHER PUBLICATIONS eSOFT, "Web Content Filter Solution: Email Content Filter," http://www.esoft.com/network-security-appliances/add-ons/content-filter/, accessed on Jun. 30, 2012 (1 page).

(Continued)

*Primary Examiner* — Melanie Jagannathan
(74) *Attorney, Agent, or Firm* — Hanley, Flight & Zimmerman, LLC

(57) ABSTRACT

Network-based content filtering utilizing user-specified parameters is disclosed. Example methods disclosed herein to perform network-based content filtering include receiving, at an incoming edge router of a provider network, incoming data to be routed in the provider network to a destination device, and before routing the incoming data in the provider network, determining whether to restrict the routing of the incoming data in the provider network to the destination device based on a parameter associated with the destination device, the parameter being related to a content classification of the incoming data.

20 Claims, 9 Drawing Sheets

(56) References Cited

OTHER PUBLICATIONS

Verizon, "Data Services: Content Filtering," http://support.verizonwireless.com/clc/features/data_services/content_filtering.html, accessed on Jul. 26, 2012 (1 page).

Wikipedia, "Ad Filtering," http://en.wikipedia.org/wiki/Ad_filtering, accessed on Jul. 26, 2012 (4 pages).

Wikipedia, "Content Filtering," http://en.wikipedia.org/wiki/Content_filtering, accessed on Jul. 26, 2012 (2 pages).

* cited by examiner

US 9,385,946 B2

NETWORK-BASED CONTENT FILTERING UTILIZING USER-SPECIFIED PARAMETERS

FIELD OF THE DISCLOSURE

This disclosure relates generally to content filtering and, more particularly, to network-based content filtering utilizing user-specified parameters.

BACKGROUND

The use of electronic devices to download and/or stream media rich content is becoming commonplace. For example, consumers can use mobile devices and/or desktop computers to request data content, such as webpages, media files, streaming video, streaming audio, etc., from a multitude of Internet-based and web-based data sources. However, in addition to the primary data content requested by a consumer, such data sources may also provide, or cause one or more other data sources to provide, unrequested secondary data content along with the requested primary data content. For example, Internet-based and web-based data sources routinely provide unrequested advertisement content in addition to the primary data content requested by the user. Furthermore, such secondary data content utilizes network resources and can count towards a user's service plan limit(s) even though it is not requested by the user.

BRIEF DESCRIPTION OF THE DRAWINGS

Wherever possible, the same reference numbers will be used throughout the drawing(s) and accompanying written description to refer to the same or like elements, parts, etc.

DETAILED DESCRIPTION

Figure 1:
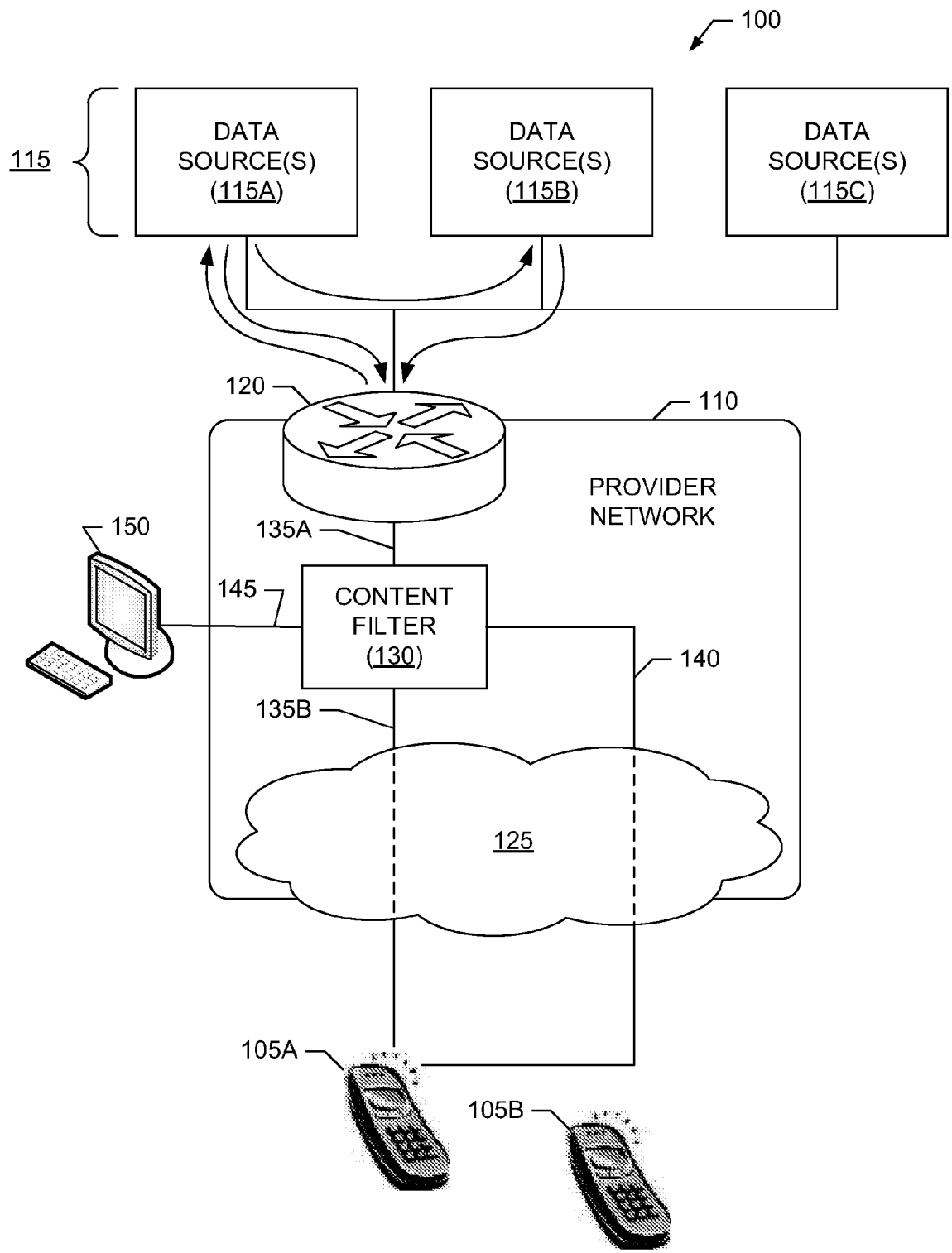
FIG. 1 is block diagram of an example communication system supporting network-based content filtering utilizing user-specified parameters as disclosed herein.

Methods, apparatus and articles of manufacture (e.g., storage media) for network-based content filtering utilizing user-specified parameters are disclosed herein. Example methods disclosed herein to perform network-based content filtering utilizing user-specified parameters include receiving, at an incoming edge router of a provider network, incoming data to be routed in the provider network to a destination device. Such example methods also include determining, before routing the incoming data in the provider network, whether to restrict the routing of the incoming data in the provider network to the destination device based on a parameter specified by a user associated with the destination device. In such examples, the parameter is related to a content classification of the incoming data.

In some examples, the parameter is a first parameter corresponding to a content restriction preference specified by the user. The content restriction preference identifies a content category to be restricted from being routed to the destination device. For example, the content restriction preference can include, but is not limited to, a content type, a data type, a source type, a data size range, a bandwidth range, a quality of service, etc. Furthermore, some such example methods also include determining whether to restrict the routing of the incoming data in the provider network to the destination device based on a second parameter specified by the user associated with the destination device. For example, the second parameter can correspond to a triggering condition that is to trigger whether the content restriction preference is to be enabled to restrict the routing of the incoming data. In such examples, the preference triggering condition can include, but is not limited to, a service plan status, a billing cycle status, a time of day, an authorization status, etc.

Additionally or alternatively, some such example methods further include retrieving the user-specified parameter based on an identifier associated with the destination device. In some such examples, the identifier can be included in the incoming data.

Additionally or alternatively, in some such example methods, the incoming data is received in response to a request from the destination device. In such examples, the incoming data can include first data provided by a first source to which the request was directed, and second data provided by a second source to which the request was not directed. Such example methods can further include routing the first data in the provider network to the destination device, but preventing, based on the user-specified parameter, the second data from being routed in the provider network to the destination device.

Other disclosed example methods for network-based content filtering utilizing user-specified parameters include retrieving a first parameter and a second parameter associated with a destination device to which incoming data received at a provider network is to be routed. In such examples, the first parameter and the second parameter are specified by a user associated with the destination device. Furthermore, at least one of the first parameter or the second parameter is related to a content classification of the incoming data. Such example methods also include filtering the incoming data based on the first parameter and the second parameter prior to the incoming data being routed to the destination device.

In some examples, the parameter is a first parameter corresponding to a content restriction preference that identifies a content category to be restricted from being routed to the destination device. For example, the content restriction preference can include, but is not limited to, a content type, a data type, a source type, a data size range, a bandwidth range, a quality of service, etc. In some such examples, the content restriction preference is a first content restriction preference, and the second parameter corresponds to a second content restriction preference identifying a second content category to be restricted from being routed to the destination device. However, in other such examples, the second parameter corresponds to a triggering condition that is to trigger whether the content restriction preference (e.g., corresponding to the first parameter) is to be enabled to restrict the routing of the incoming data. In such examples, the preference triggering condition can include, but is not limited to, a service plan status, a billing cycle status, a time of day, an authorization status, etc.

Additionally or alternatively, some such example methods further include retrieving the first parameter and the second parameter based on an identifier associated with the destination device. In some such examples, the identifier can be included in the incoming data.

Further example methods, apparatus and articles of manufacture (e.g., storage media) for network-based content filtering utilizing user-specified parameters are described in greater detail below.

As noted above, a request sent to a data source (also referred to herein as a data originator) to cause data content (referred to herein as primary data content) to be provided to a destination device can also cause unrequested, additional data content (reference to herein as secondary data content) to be provided to the destination device as well. As also noted above, such secondary data content utilizes network resources and can count towards a user's service plan limit(s) even though the secondary data content is not requested by the destination device or a user of the destination device. For example, it has been estimated that a web page download can also include additional advertisement content (also referred to herein as ad content) representing up to 15% of the total data passed from the data source to the destination device in response to the request to download the web page. With the elimination of unlimited data plans by many mobile service providers, and also by some fixed broadband service providers, the download of such unrequested data content is becoming an increasing concern for many consumers. Furthermore, the routing of such unrequested data content can place an unnecessary burden on a service provider's network resources.

Content filtering enables data to be filtered (e.g., restricted, modified, blocked, etc.) based on its content. For example, content filtering can involve classifying received data into categories based on the content of the data, and then restricting (e.g., blocking, limiting, etc.) and/or modifying the data based on its classification. Prior content filtering techniques include techniques implemented by the destination device that receives the data to restrict and/or modify the presentation of the data (e.g., such as by blocking data content classified into one or more categories from being presented on the device, such as for spam blocking). However, such prior content techniques are not well-suited to filtering the unrequested secondary content provided above because, for example, the data that is to undergo content filtering would already have been provided to the destination device and, thus, would have already impacted a user's limited service plan and utilized the service provider's network resources for data routing. Other prior content filtering techniques include techniques implemented at the data source to perform content filtering on the data before it is sent to the destination device. However, for such techniques to support user-specified content filtering parameters, such user-specified parameters would need to be provided, and standardized, among a potentially large number of data sources, which may be infeasible. Yet other content filtering techniques involve the use of proxy servers in the service provider's network. However, such techniques generally have limited to no support for user-specified content filtering parameters, and/or still involve utilizing service provider network resources to route data (e.g., the unrequested, secondary data content) that is ultimately to be restricted by the content filter (but which may still count towards a user's limited service plan).

Unlike such prior content filtering techniques, network-based content filtering utilizing user-specified parameters as disclosed herein enables unrequested, secondary data content, or any other data content, to be filtered (e.g., restricted, modified, etc.) based on user-specific, and/or user-specified parameters prior to utilizing a service provider's network resources for routing the data. Furthermore, such user-specified parameters can be applied to any data being provided by any data source to a destination device, rather than being applicable to only a specific data source (or data provider) as in some prior techniques. Moreover, network-based content filtering utilizing user-specified parameters as disclosed herein enables a user to reduce data consumption and/or better manage data usage, while allowing a service provider to maintain neutrality as to the data content being routed within its network.

Turning to the figures, a block diagram of an example communication system 100 capable of providing network-based content filtering utilizing user-specified parameters as disclosed herein is illustrated in FIG. 1. The communication system 100 includes multiple example user devices 105A-B in communication with an example provider network 110, such as an Internet service provider (ISP) network 110. The provider network 110 can correspond to any type of service provider's network, such as a mobile service provide network, a broadband service provider network, a cable service provider network, a satellite service provider network, etc.

Although the user devices 105A-B are depicted as mobile phones in FIG. 1, the user devices 105A-B are not limited thereto. For example, the user devices 105A-B can each be any device that is capable of accessing the provider network 110, which in turn provides access to the Internet and/or any other type(s) of service-oriented network(s). For example, the user devices 105A-B can be implemented by mobile phones (such as smartphones, cellular phones, 3G, 4G or long term evolution (LTE) wireless devices, etc.), wireless access points (such as Wi-Fi devices, Bluetooth devices, aircards, etc.), personal data devices (such as personal digital assistants (PDAs), e-readers, etc.), broadband modems (such as DSL modems, cable modems, satellite modems, etc.) and/or any other type(s) of electronic devices or combinations thereof.

In the illustrated example of FIG. 1, the provider network 110 provides the user devices 105A-B with access to one or more example data sources 115. The data sources(s) 115 include, for example, sources of primary data content (e.g., the example data source(s) 115A shown in FIG. 1), such as one or more streaming media sources (e.g., such as streaming services offered by Netflix®, Hulu®, etc.), one or more on-demand media download sources (e.g., such as Apple iTunes®), one or more video conferencing services, one or more web servers, etc. The data source(s) 115 can also include, for example, sources of secondary content (e.g., the example data source(s) 115B shown in FIG. 1), such as one more one or more advertisement sources providing streaming media (e.g., video and/or audio) advertisements, image advertisements, text advertisements, etc. In some examples, the data source(s) 115 can include other sources of data content (e.g., the example data source(s) 115C shown in FIG. 1), and/or other user devices (not shown) capable of uploading content (e.g., such as video chat content) that is able to be received by the user devices 105A-B.

In the illustrated example of FIG. 1, data being provided by the data source(s) 115 to the user devices 105A-B enters the provider network 110 via one or more example edge routers 120 defining the boundary of the provider network 110. For example, the illustrated example edge router 120 may be communicatively coupled via any type of wireless and/or wired connection with one or more of the data source(s) 115. Additionally or alternatively, one or more of the data source(s) 115 may be communicatively coupled with the edge router 120 via one or more networks, routers (e.g., customer edge (CE) routers), gateways, etc. The edge router 120 of the illustrated example can be implemented by any type of networking element, such as a provider edge (PE) router, a border router (e.g., an area border router, an autonomous system border router, etc.), a bridge, a gateway, etc.

The provider network 110 includes an example routing network 125 to route data received at the edge router(s) 120 from the data source(s) 115 to the user devices 105A-B. The routing network 125 can also be used to route data generated within the provider network 110 to the user devices 105A-B. As such, the routing network 125 can be implemented using any type of routing network elements and protocols, such as by a network of provider (P) routers, core routers, bridges, gateways, etc.

The provider network 110 of the illustrated example also includes an example content filter 130 to perform network-based content filtering utilizing user-specified parameters as disclosed herein. In the illustrated example, data received from a content source 115 at the edge router 120 for routing to, for example, the user device 105A is processed by the content filter 130 before being provided to the routing network 125 for routing to the user device 105A (which is illustrated by a line 135A-B in FIG. 1). As shown in FIG. 1, the content filter 130 filters (e.g., restricts, modifies, etc.) some or all of the data received at the edge router 120 from the content source 115 before it reaches the routing network 125. The filtering performed by the content filter 115 of the illustrated example is based on one or more parameters specified by a user of, or otherwise associated with, the user device 105A (which is illustrated by a line 140 in FIG. 1). As described in greater detail below, the parameters specified by the user and utilized by the content filter 130 can include, for example, one or more content restriction preferences, one or more preference triggering conditions, etc. In some examples, a client application, such as a web browser, a downloaded application, an app, etc., executing on or otherwise implemented by the user device 105A, or another device, can be used by a user to access the content filter 130 and specify the parameter(s) to be associated with the user device 105A.

In some examples, the user-specified parameters are stored by the content filter 130 in user profile(s) that are associated respectively with the different user device(s) 105A-B whose data can undergo content filtering. For example, the provider network 110 can provide content filtering as a value-added service and create user profile(s) for the user device(s) 105A-B for which a user has subscribed to the content filtering service. In such examples, a user profile can be uniquely linked with an associated user device based on one or more device identifiers. Such device identifiers can include, but are not limited to, phone numbers, network addresses (e.g., such as Internet protocol (IP) addresses, medium access control (MAC) addresses, etc.), universal resource identifiers (URIs), subscriber identities (e.g., such as an Internet mobile subscriber identity (IMSI)), etc., assigned to the user devices.

In the illustrated example, to filter incoming data received at the edge router 120 that is to be routed to a user device, such as the user device 105A, the content filter 130 uses one or more device identifiers assigned to the user device 105A to retrieve the user profile associated with the device. As described in detail below, in some examples, the content filter 130 can obtain the device identifier(s) for the user device 105A from the incoming data itself. After retrieving the user profile associated with the user device 105A, the content filter 130 processes the user-specified parameters included in the user profile to determine whether and, if so, how the incoming data is to be filtered before being routed to the user device 105A.

For example, the user-specified parameters in the retrieved user profile for the user device 105A can include one or more user-specified content restriction preferences. A content restriction preference specifies one or more criteria by which the content filter 130 is to filter (e.g., restrict, modify, etc.) data based on its content. For example, a content restriction preference can include a content type, a data type, a source type, a data size range, a bandwidth range, a quality of service type, etc., that is to be used by the content filter 130 to determine whether to restrict, modify, etc., or otherwise filter some or all of the incoming data to be routed to, for example, the user device 105A. In some examples, the content restriction preferences capable of being specified by a user correspond to one or more data content categories that have been configured in the provider network 110 (e.g., by a service administrator). In such examples, the content filter 130 may support an interface (e.g., represented by a line 145 in FIG. 1) to an example administration workstation 150 or other computing device via which the service provider (e.g., a service administrator) can specify the data content categories that are to be used by the content filter 130 as criteria for content filtering. Examples of specifying content categories, classifying incoming data based on specified content categories, and filtering the incoming data based on user-specified content restriction preference(s) are described in greater detail below.

In some examples, the user-specified parameters in the retrieved user profile for the user device 105A include one or more preference triggering conditions that can be used by the content filter 130 to determine whether a particular user-specified content restriction preference (e.g., also included in the retrieved user profile) is to be triggered and, thus, utilized during filtering of the incoming data. For example, a preference triggering conditions can include a service plan status, a billing cycle status, a time of day, an authorization status, etc., that is to be used by the content filter 130 to determine whether an associated user-specified content restriction preference can be utilized to restrict, modify, etc., or otherwise filter some or all of the incoming data prior to the data being routed to, for example, the user device 105A. In some examples, the preference triggering conditions capable of being specified by a user are configured in the content filter 130 by the service provider (e.g., via the administration workstation 150). Examples of configuring, specifying and utilizing preference triggering conditions are described in greater detail below.

Although two user devices 105A-B are illustrated in the example of FIG. 1, the communication system 100 can support network-based content filtering for any number of user devices 105A-B. The communication system 100 can also support any number and/or type(s) of data sources 115. Furthermore, the provider network 110 can include any number and/or type(s) of edge router(s) 120, routing network(s) 125, etc. Moreover, although one content filter 130 is illustrated in the example of FIG. 1, the provider network 110 can support any number of content filters 130 in communication with and/or implemented by the same or different edge router(s) 120 to perform network-based content filtering utilizing user-specified parameters as disclosed herein.

Figure 2:
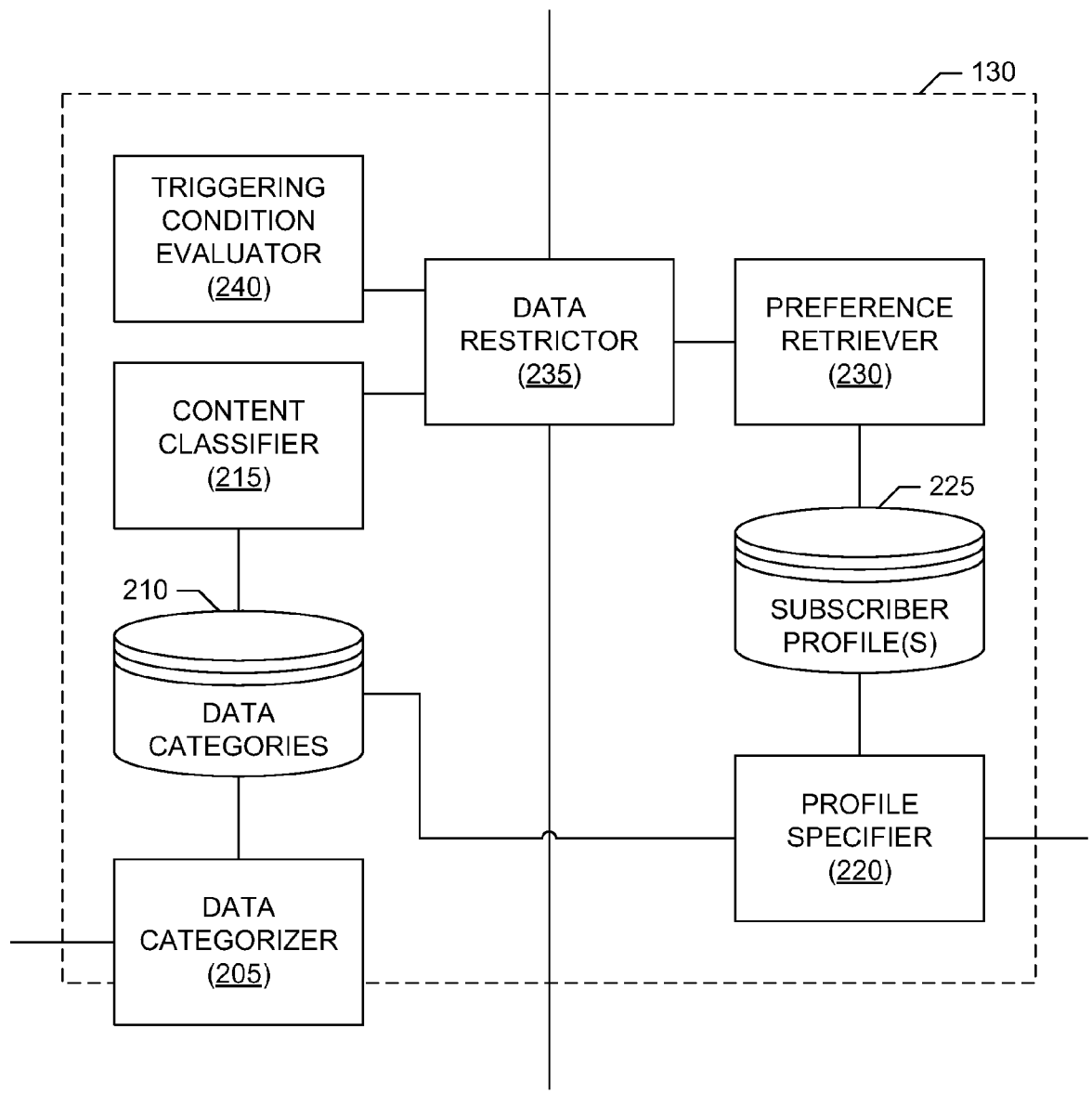
FIG. 2 is a block diagram of an example content filter that can be used to implement the example communication system of FIG. 1.

A block diagram of an example implementation of the content filter 130 of FIG. 1 is illustrated in FIG. 2. The example content filter 130 of FIG. 2 includes an example data categorizer 205 to enable the configuration of data content categories for use by the content filter 130 in classifying data for content filtering. In the illustrated example, the data categorizer 205 implements a user interface that is accessible by an external computing device, such as the workstation 150, via an appropriate client application (e.g., such as a web browser, an app, etc.) to receive configuration information specifying the data content categories supported by the content filter 130. In the illustrated example, the configuration information specifying the data content categories supported by the content filter 130 is stored in an example data category storage 210. The data category storage 210 can be implemented by any type or combination of temporary and/or permanent tangible storage media, such as one or more of cache, volatile memory, flash memory, disk storage, etc., including but not limited to one or more of the mass storage devices 1028 and/or volatile memory 1014 in the example processing system 1000 of FIG. 10, which is described in greater detail below.

In some examples, the configuration information obtained by the data categorizer 205 defines a data content categorization based on data type. In such examples, the configuration information specifies a set of data type categories into which incoming data processed by the content filter 130 can be classified. Example data type categories that can be configured by the data categorizer 205 include, but are not limited to, a video category, an audio category, an image category, a multimedia data category (e.g., corresponding to a downloaded web page), a text file category, a "data type—other" category (e.g., to cover data not classifiable into the other configured data type categories), etc.

In some examples, the configuration information obtained by the data categorizer 205 additionally or alternatively defines a data content categorization based on source type. In such examples, the configuration information specifies a set of source type categories into which incoming data processed by the content filter 130 can be classified. Example source type categories that can be configured by the data categorizer 205 include, but are not limited to, a primary source category, a secondary source category, a "source type—other" category (to cover data not classifiable into the other configured source type categories), etc. In some examples, the primary source category corresponds to data that is being provided by a data source from which content has been requested by a user device (e.g., such as the user device 105A), whereas secondary source category corresponds to data that is being provided by a data source from which content has not been requested by a user device. In such examples, the primary source category may correspond to data provided by one or more streaming media sources (e.g., such as streaming services offered by Netflix®, Hulu®, etc.), one or more on-demand media download sources (e.g., such as Apple iTunes®), one or more video conferencing services, one or more web servers, etc., whereas the secondary source category may correspond to data provided by one or more advertisement sources or other ancillary content sources. Additionally or alternatively, in some examples, the primary source category may be specified by a list of known primary content sources, and the secondary source category may be specified by a list of known secondary content sources (e.g., specified by name, URI, IP address, etc.).

In some examples, the configuration information obtained by the data categorizer 205 additionally or alternatively defines a data content categorization based on ranges of data sizes. In such examples, the configuration information specifies a set of data size range categories into which incoming data processed by the content filter 130 can be classified. Example data size range categories that can be configured by the data categorizer 205 include, but are not limited to, a first size range corresponding to data having a size (e.g., a file or chunk size) greater than a first value (e.g., 5 megabytes or some other value), a second size range corresponding to data having a size less than or equal to the first value (e.g., 5 megabytes or some other value) and greater than a second value (e.g., 500 kilobytes or some other value), a third size range corresponding to data having a size less than or equal to the second value (e.g., 500 kilobytes or some other value) and greater than a third value (e.g., 50 kilobytes or some other value), and so on, down to a final size range corresponding to data having a size less than or equal to a final value (e.g. 5 kilobytes or some other value).

In some examples, the configuration information obtained by the data categorizer 205 additionally or alternatively defines a data content categorization based on ranges of data bandwidth. In such examples, the configuration information specifies a set of data bandwidth range categories into which incoming data processed by the content filter 130 can be classified. Example bandwidth range categories that can be configured by the data categorizer 205 include, but are not limited to, a first bandwidth range corresponding to data consuming a portion of bandwidth greater than a first percentage (e.g., 75% or some other value) of a total available bandwidth for the user device, a second bandwidth range corresponding to data consuming a portion of bandwidth less than or equal to the first percentage (e.g., 75% or some other value) and greater than a second percentage (e.g., 50% or some other value) of the total available bandwidth for the user device, a third bandwidth range corresponding to data consuming a portion of bandwidth less than or equal to the second value (e.g., 50% or some other value) and greater than a third percentage (e.g., 25% or some other value) of the total available bandwidth for the user device, and so on, down to a final bandwidth range corresponding to data consuming a portion of bandwidth less than or equal to a final value (e.g. 5% or some other value) of the total available bandwidth for the user device.

In some examples, the configuration information obtained by the data categorizer 205 additionally or alternatively defines a data content categorization based on quality of service (QoS) types. In such examples, the configuration information specifies a set of QoS type categories into which incoming data processed by the content filter 130 can be classified. Example QoS type categories that can be configured by the data categorizer 205 include, but are not limited to, a real-time category (e.g., such as a conversational category or other category requiring data to be exchanged with negligible delay), a streaming category (e.g., corresponding to near real-time data exchanges), an interactive category (e.g., allowing more delay), a background category (e.g., for data exchanges that can run in the background), a "QoS type—other" category (e.g., to cover data not classifiable into the other configured QoS type categories), etc.

In some examples, the configuration information obtained by the data categorizer 205 additionally or alternatively defines a data content categorization based on other content types. In such examples, the configuration information specifies a set of other content type categories into which incoming data processed by the content filter 130 can be classified. Examples of such other content types that can be configured by the data categorizer 205 include, but are not limited to, an advertising content type, a movie content type, a television episode content type, a media clip type (e.g., which may include audio and/or video clips), a "content type—other" category (e.g., to cover data not classifiable into the other configured type categories), etc.

To classify incoming data into one or more content classifications, the example content filter 130 of FIG. 2 includes an example content classifier 215. In the illustrated example, the content classifier 215 uses the data content categories configured by the data categorizer 205 and stored in the data category storage 210 to classify the incoming data received by the content filter 130. In some examples, the content classifier 215 determines the protocol being used to format and/or communicate the incoming data to identify portions of the data (e.g., such as headers, fields, bits, etc.) that may be used to perform content classification. For example, the content classifier 215 may compare the incoming data with possible communication protocols to identify headers, field, bits, etc., describing the source address for the data source providing the incoming data (for source type classification), the size of the incoming data (for data size range classification), the QoS associated with the incoming data (for QoS type classification), etc. Additionally or alternatively, the content classifier 215 may compare the incoming data with possible data formatting protocols to identify headers, field, bits, etc., describing the type of the incoming data (e.g., for data type classification), the content of the incoming data (e.g., for content type classification), etc. Additionally or alternatively, the content classifier 215 may evaluate the amount of incoming data being provided to the same user device in a period of time to determine the size of the incoming data (for data size range classification), the bandwidth being used by the incoming data (for bandwidth range classification), etc.

For example, if the content classifier 215 determines that the incoming data is formatted according to a particular streaming or communication protocol, the content classifier 215 can parse the appropriate fields of the protocol to ascertain source identifying information, data type information, content type information, data size range information, etc. In some examples, the content classifier 215 additionally or alternatively analyzes the payload over time (e.g., based on any heuristic-based technique), to ascertain the type of content being carried in the protocol payload fields. In some examples, the content classifier 215 tags the incoming data with metadata, header data, etc., indicating the classification(s) into which the incoming data has been classified.

The example content filter 130 of FIG. 2 also includes an example profile specifier 220 to enable a user to specify a content filtering profile to be associated with a particular user device, such as the user device 105A. In some examples, the profile specifier 220 implements a user interface that is accessible via an appropriate client application (e.g., such as a web browser, an app, etc.) and via which the user may specify one or more content restriction preferences and/or triggering conditions. The specified parameter(s) is(are) included in a user profile for use by the content filer 130 for filtering incoming data to be routed to the user device 105A. In the illustrated example, the user profile specified by the profile specifier 220 is stored in an example profile storage 225. The profile storage 225 can be implemented by any type or combination of temporary and/or permanent tangible storage media, such as one or more of cache, volatile memory, flash memory, disk storage, etc., including but not limited to one or more of the mass storage devices 1028 and/or volatile memory 1014 in the example processing system 1000 of FIG. 10, which is described in greater detail below.

In some examples, the user-specified content restriction preferences are related to content classifications into which the incoming data processed by the content filter 130 can be classified. For example, the content restriction preferences capable of being specified by the user correspond to the data content categories stored in the data category storage 210. In such examples, the user specifies a content restriction preference using the profile specifier 220 by selecting or otherwise identifying one (or a combination) of the possible, configured data categorizations that are to be filtered (e.g., restricted/blocked, modified, etc.) by the content filter 130.

For example, a content restriction preference can specify a particular content category, such as a particular data type category (e.g., streaming video, streaming audio, etc.), a particular source type (e.g., secondary), a data size range category (e.g., data having a size exceeding a particular value), a bandwidth range category (e.g., data consuming a percentage of bandwidth exceeding a particular value), a QoS type category, a content category (e.g., advertisement), etc., such that data classified by the content classifier 215 into the specified content category is restricted (e.g., prevented or blocked) from being routed (e.g., by the routing network 125) to the user device 105A. In some examples, a content restriction preference can specify a particular combination of such categories (e.g., a streaming video advertisement having a data size greater than a particular value) such that data classified by the content classifier 215 into the specified combination of categories is restricted (e.g., prevented or blocked) from being routed (e.g., by the routing network 125) to the user device 105A.

In some examples, the profile specifier 220 also enables the user to specify one or more preference triggering conditions for inclusion in a user profile associated with a particular device, such as the user device 105A. One or more trigger conditions can be specified for conditioning whether a particular user-specified content restriction preference (or combination of preferences) is to be triggered (e.g., used, enabled, activated, etc.) to thereby enable content filtering based on the particular user-specified content restriction preference (or combination of preferences). Examples of preference triggering conditions include, but are not limited to, a service plan status (e.g., such as an amount of data remaining in a data usage plan), a billing cycle status (e.g., such as an amount of time remaining in the current billing cycle), a time of day, an authorization status (e.g., such as whether a user has authorized or disabled use of a particular profile or preference included in a profile), etc.

For example, a user may be unconcerned about filtering incoming data based on content until the user's data service plan associated with the user device 105A is close to being exceeded. In such examples, the user may specify one or more trigger conditions based on service plan status and/or billing cycle status (e.g., the latter being relevant because data plan usage is likely to become an increasing concern closer to the end of the billing cycle) to be used to trigger an associated user-specified content restriction preference (e.g., filter streaming video advertisements having a size exceeding a particular value). This enables incoming data to be filtered (e.g., restricted) only when the trigger condition(s) is(are) satisfied (e.g., such as when a particular portion of the data plan has been consumed and/or a particular part of the billing cycle has been reached). As another example, a user's service plan may be such that data access charges vary depending on the time of day. In such examples, a time of day trigger can be used to cause data meeting a user-specified content restriction preference to be blocked only during the time(s) of day associated with higher access charges.

The example content filter 130 of FIG. 2 further includes an example preference retriever 230 to retrieve a user profile from the profile storage 225 in response to the content filter 130 receiving incoming data to be routed to a particular user device, such as the user device 105A. In some examples, the preference retriever 230 retrieves, from the profile storage 225, a user profile that is unique to the user device 105A, whereas in other examples, the preference retriever 230 retrieves a user profile that may be common to multiple user devices, such as a group of user devices associated with the same user/subscriber. In the illustrated example, the preference retriever 230 retrieves a user profile from the profile storage 225 based on a device identifier capable of identifying the user device 105A. For example, the device identifier may be a phone number, a network address (e.g., such as an IP address, a MAC address, etc.), a URI, a subscriber identity (e.g., such as an IMSI), etc., assigned to the user device 105A. In some examples, the preference retriever 230 determines the device identifier for the user device 105A by processing the incoming data to determine destination information (e.g., address information) included in one or more identified protocol fields, headers, etc., which may be mapped to a device identifier.

After retrieving the appropriate user profile from the profile storage 225, the preference retriever 230 provides any user-specified content restriction preference(s) and/or triggering condition(s) included in the retrieved profile to an example data restrictor 235 included in the content filter 130 of the illustrated example. The example data restrictor 235 filters (e.g., restricts and/or modifies) incoming data having a content classification (or classifications) that matches the user-specified content restriction preference(s) included in the retrieved profile. For example, the data restrictor 235 may compare the content classification(s) determined by the content classifier 215 for the incoming data to the user-specified content restriction preference(s) included in the retrieved profile, and then restrict (e.g., block) the incoming data from being routed to the user device 105A if the data's content classification(s) match the user-specified content restriction preference(s). In some examples, if only a portion of the incoming data has content classification(s) that match the user-specified content restriction preference(s), the data restrictor 235 modifies the incoming data to restrict only the affected portion of the incoming data from being routed to the user device 105A, whereas the remaining portion of the incoming data is permitted to be routed to the user device 105A. For example, if the incoming data includes requested data provided by a primary content source 115A (e.g., from which the data was requested by the user device 105A) and unrequested data provided by a secondary content source 115B, and a user-specified content restriction preference indicates that data from secondary content sources is to be filtered (e.g., restricted), then the data restrictor 235 restricts (e.g., blocks) the unrequested data provided by the secondary content source 115B from being routed to the user device 105A, but permits the requested data provided by the primary content source 115A to be routed to the user device 105A.

In the example of FIG. 2, if the user profile includes one or more trigger conditions, the data restrictor provides the trigger conditions to an example trigger condition evaluator 240 for evaluation. In the illustrated example, the trigger condition evaluator 240 accesses one or more auxiliary data sources to evaluate whether a particular trigger condition has been satisfied. For example, the trigger condition evaluator 240 may access a customer relations database or similar system to evaluate trigger conditions involving service plan status, billing cycle status, etc. Additionally or alternatively, in some examples, the trigger condition evaluator 240 may access or include a clock or other timing source to evaluate trigger conditions involving time of day, billing cycle status, etc. Additionally or alternatively, in some examples, the trigger condition evaluator 240 may access an authorization server or other security system to evaluate trigger conditions involving authorization status, etc. The trigger condition evaluator 240 provides the results of evaluating any trigger conditions to the data restrictor 235, which determines which, if any, of the user-specified content restriction preference(s) are to be triggered (e.g., enabled, asserted, etc.) in accordance with the specified trigger conditions.

While an example manner of implementing the content filter 130 of FIG. 1 has been illustrated in FIG. 2, one or more of the elements, processes and/or devices illustrated in FIG. 2 may be combined, divided, re-arranged, omitted, eliminated and/or implemented in any other way. Further, the example data categorizer 205, the example data category storage 210, the example content classifier 215, the example profile specifier 220, the example profile storage 225, the example preference retriever 230, the example data restrictor 235, the example trigger condition evaluator 240 and/or, more generally, the example content filter 130 of FIG. 2 may be implemented by hardware, software, firmware and/or any combination of hardware, software and/or firmware. Thus, for example, any of the example data categorizer 205, the example data category storage 210, the example content classifier 215, the example profile specifier 220, the example profile storage 225, the example preference retriever 230, the example data restrictor 235, the example trigger condition evaluator 240 and/or, more generally, the example content filter 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example content filter 130, the example data categorizer 205, the example data category storage 210, the example content classifier 215, the example profile specifier 220, the example profile storage 225, the example preference retriever 230, the example data restrictor 235 and/or the example trigger condition evaluator 240 are hereby expressly defined to include a tangible computer readable medium such as a memory, digital versatile disk (DVD), compact disk (CD), Blu-ray Disc™, etc., storing such software and/or firmware. Further still, the example content filter 130 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the example communication system 100, the example content filter 130, the example data categorizer 205, the example data category storage 210, the example content classifier 215, the example profile specifier 220, the example profile storage 225, the example preference retriever 230, the example data restrictor 235 and/or the example trigger condition evaluator 240 are shown in FIGS. 3-9. In these examples, the machine readable instructions represented by each flowchart may comprise one or more programs for execution by a processor, such as the processor 1012 shown in the example processing system 1000 discussed below in connection with FIG. 10. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1012, but the entire program or programs and/or portions thereof could alternatively be executed by a device other than the processor 1012 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 3-9 may be implemented manually. Further, although the example machine readable instructions are described with reference to the flowcharts illustrated in FIGS. 3-9, many other methods of implementing the example communication system 100, the example content filter 130, the example data categorizer 205, the example data category storage 210, the example content classifier 215, the example profile specifier 220, the example profile storage 225, the example preference retriever 230, the example data restrictor 235 and/or the example trigger condition evaluator 240 may alternatively be used. For example, with reference to the flowcharts illustrated in FIGS. 3-9, the order of execution of the blocks may be changed, and/or some of the blocks described may be changed, eliminated, combined and/or subdivided into multiple blocks.

As mentioned above, the example processes of FIGS. 3-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 3:
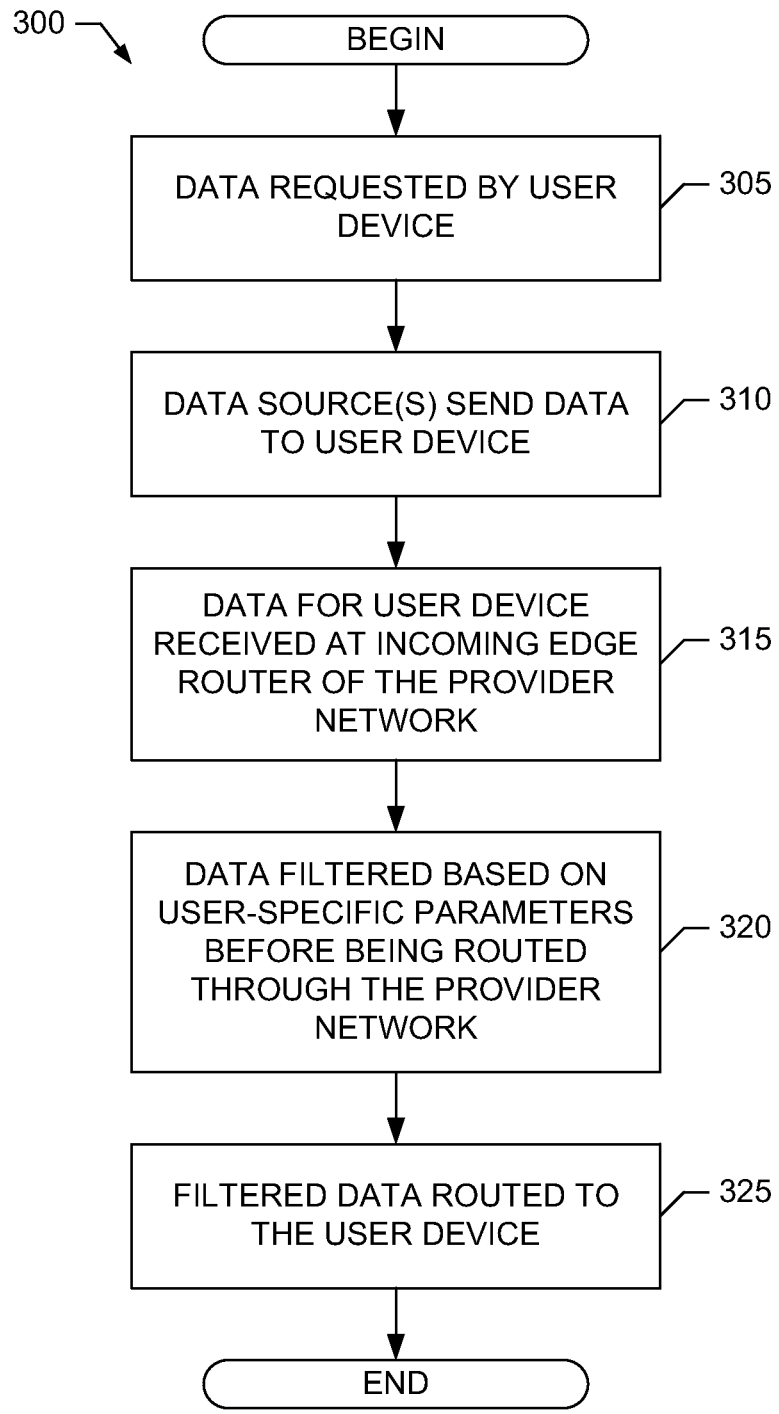
FIG. 3 is a flowchart representative of example machine readable instructions that may be executed to implement the example content filter of FIG. 2 and/or the example communication system of FIG. 1.

Example machine readable instructions 300 that may be executed to implement the example content filter 130 of FIGS. 1-2 and/or, more generally, the example communication system 100 of FIG. 1, are represented by the flowchart shown in FIG. 3. For convenience, and without loss of generality, execution of the machine readable instructions 300 is described in the context of the content filter 130 of FIG. 2 being used to implement the example communication system 100 of FIG. 1. With reference to the preceding figures and associated descriptions, the machine readable instructions 300 of FIG. 3 begin execution at block 305 at which the user device 105A sends a request to a data source 115 that is to cause the data source 115 to provide (e.g., download, stream, etc.) data to the user device 105A. At block 310, one or more of the data sources 115 begin sending data to the user device 105A in response to the request. As noted above, the data sent to the user device 105A in response to the request at block 305 can include the requested data content, but can also include unrequested data content accompanying the requested data content.

At block 315, the data being sent by the data source(s) 115 to the user device 105A is received as incoming data at the edge router 120 of the provider network 110. As described above, the incoming data received at the edge router 120 is to be routed by the routing network 125 of the provider network 110 to the user device 105A. However, before the incoming data is routed by the routing network 125, at block 320 the incoming data received at the edge router 120 is filtered by the content filter 130 based on user-specified parameter(s), as described above. For example, and as described above, the user-specified parameters may be stored in a profile that is retrievable based on a destination device identifier included (or derivable from) the incoming data and associated with the user device 105A. At block 325, any incoming data that is not restricted by the content filtering of block 320 is routed by the routing network 125 to the user device 105A.

Figure 4:
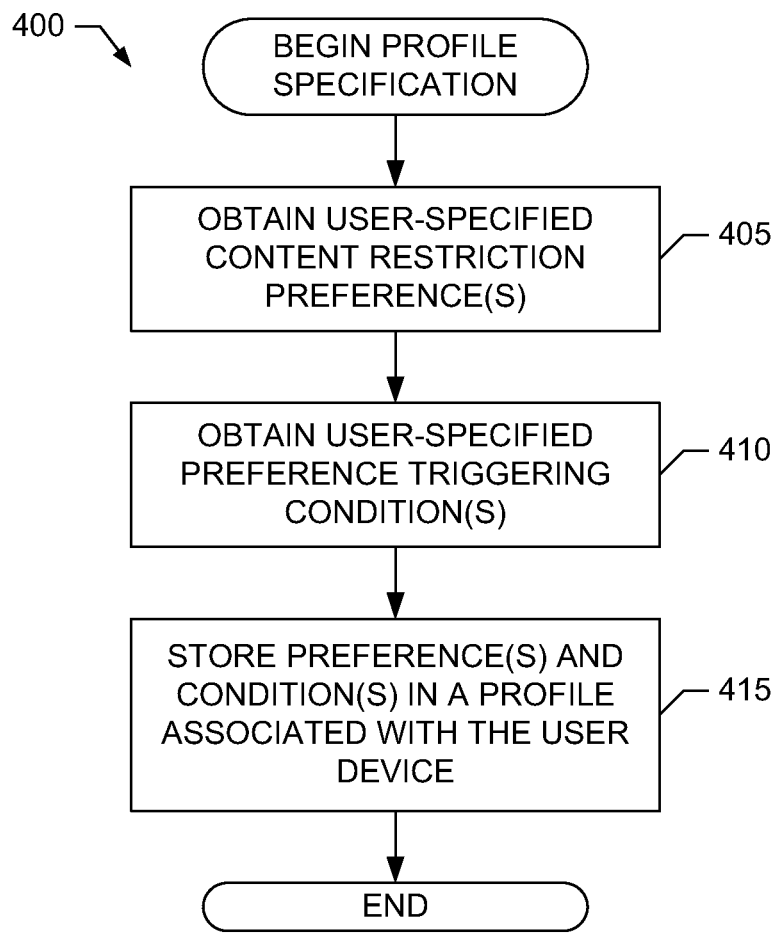
FIG. 4 is a flowchart representative of example machine readable instructions that may be executed to implement profile specification processing in the example content filter of FIG. 2.

Example machine readable instructions 400 that may be executed to implement the example profile specifier 220 of the example content filter 130 of FIG. 2 are represented by the flowchart shown in FIG. 4. For convenience, and without loss of generality, execution of the machine readable instructions 400 is described in the context of specifying an example profile to be associated with the user device 105A of FIG. 1. With reference to the preceding figures and associated descriptions, the machine readable instructions 400 of FIG. 4 begin execution at block 405 at which the profile specifier 220 obtains one or more user-specified content restriction preferences, as described above, to be associated with the user device 105A. At block 410, the profile specifier 220 obtains one or more user-specified preference triggering conditions, as described above, to be associated with the user device 105A. At block 415, the profile specifier 220 stores (e.g., in the profile storage 225) the user-specified content restriction preference(s) and the user-specified preference triggering condition(s) in a user profile. As described above, the user profile may be associated with (e.g., unique to) the user device 105A, and may be retrievable using one or more device identifiers capable of identifying the user device 105A.

Figure 5:
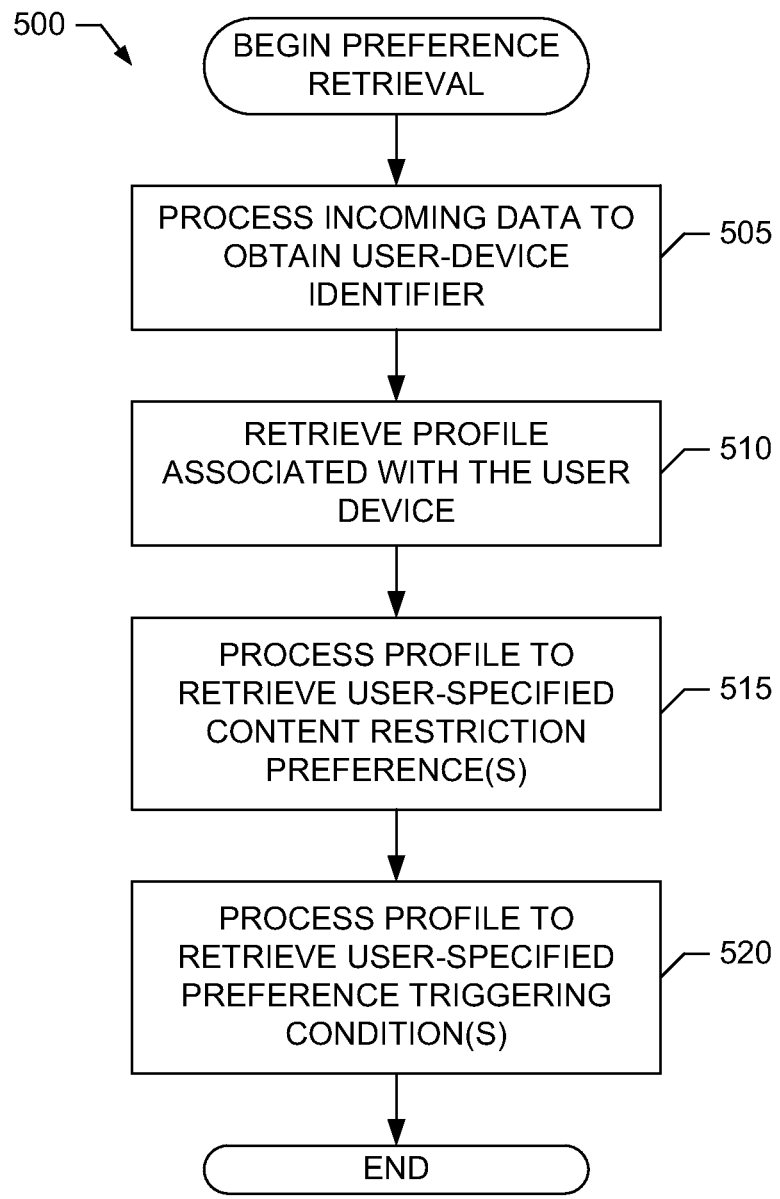
FIG. 5 is a flowchart representative of example machine readable instructions that may be executed to implement preference retrieval processing in the example content filter of FIG. 2.

Example machine readable instructions 500 that may be executed to implement the example preference retriever 230 of the example content filter 130 of FIG. 2 are represented by the flowchart shown in FIG. 5. For convenience, and without loss of generality, execution of the machine readable instructions 400 is described in the context of retrieving user-specified content restriction preference(s) and any associated user-specified preference triggering condition(s) from a user profile associated with the user device 105A of FIG. 1. With reference to the preceding figures and associated descriptions, the machine readable instructions 500 of FIG. 5 begin execution at block 505 at which the preference retriever 230 processes incoming data provided to (e.g., received by) the content filter 130 to obtain a device identifier identifying the destination of the incoming data and, thus, identifying the user device 105A. At block 510, the preference retriever 230 uses the device identifier obtained at block 505 to retrieve (e.g., from the profile storage 225) a user profile associated with the user device 105A. At block 515, the preference retriever 230 processes (e.g., parses) the retrieved profile to retrieve the content restriction preference(s) that have been specified by a user associated with the user device 105A (e.g., and which may be specific to the user device 105A). At block 520, the preference retriever 230 processes (e.g., parses) the retrieved profile to retrieve any associated preference triggering condition(s) that have been specified by the user (e.g., and which may be specific to the user device 105A).

Figure 6:
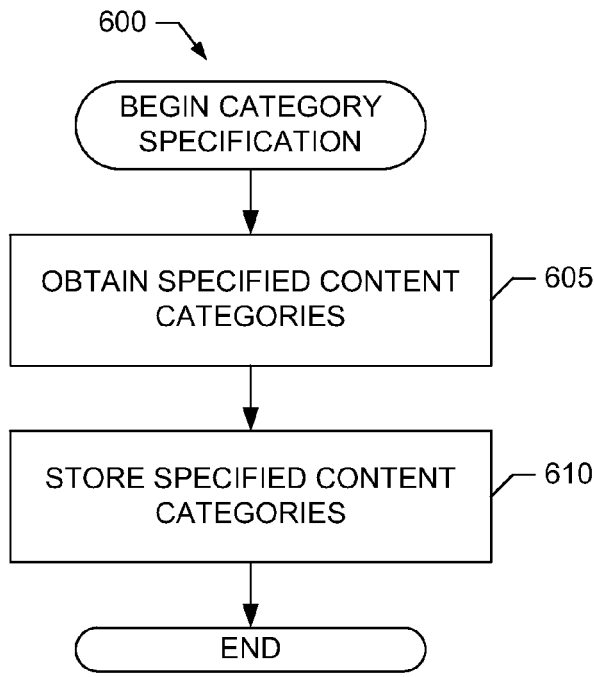
FIG. 6 is a flowchart representative of example machine readable instructions that may be executed to implement category specification processing in the example content filter of FIG. 2.

Example machine readable instructions 600 that may be executed to implement the example data categorizer 205 of the example content filter 130 of FIG. 2 are represented by the flowchart shown in FIG. 6. With reference to the preceding figures and associated descriptions, the machine readable instructions 600 of FIG. 6 begin execution at block 605 at which the data categorizer 205 obtains configuration information specifying the data content categories supported by the content filter 130, as described above. At block 610, the data categorizer 205 stores the configured data content categories, in any appropriate format, in the data category storage 210.

Figure 7:
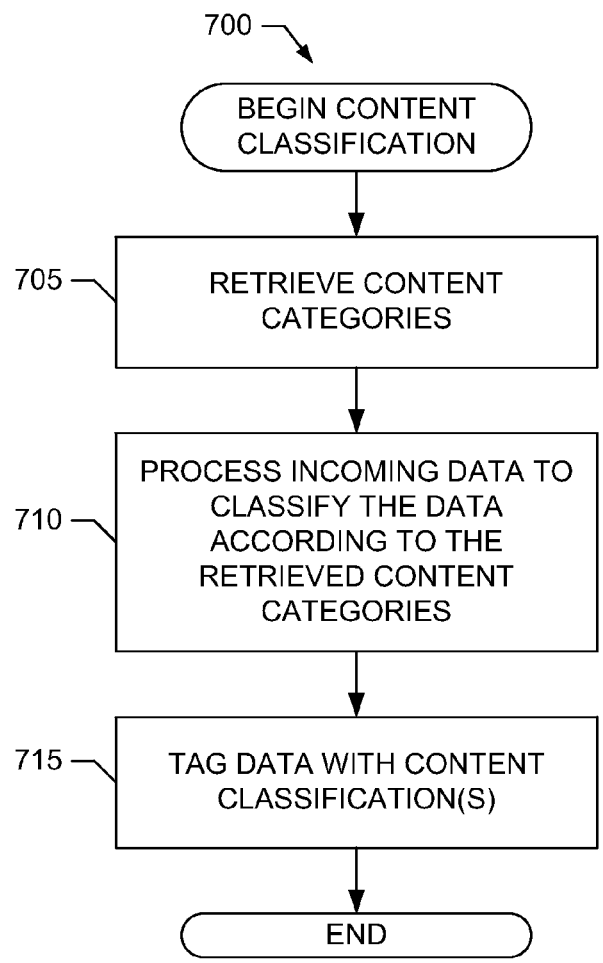
FIG. 7 is a flowchart representative of example machine readable instructions that may be executed to implement content classification processing in the example content filter of FIG. 2.

Example machine readable instructions 700 that may be executed to implement the example content classifier 215 of the example content filter 130 of FIG. 2 are represented by the flowchart shown in FIG. 7. With reference to the preceding figures and associated descriptions, the machine readable instructions 700 of FIG. 7 begin execution at block 705 at which the content classifier 215 retrieves the configured data content categories (e.g., from the data category storage 210), as described above. At block 710, the content classifier 215 processes incoming data provided the content filter 130 (e.g., and which is to be routed to the user device 105A) to classify the incoming data according to the configured data content categories, as described above. In some examples, at block 715, the content classifier 215 appends or otherwise includes content classification tag(s) (e.g., in the form of one or more headers, fields, etc.) with the incoming data to indicate the one or more data content categories into which the incoming data has been classified.

Figure 8:
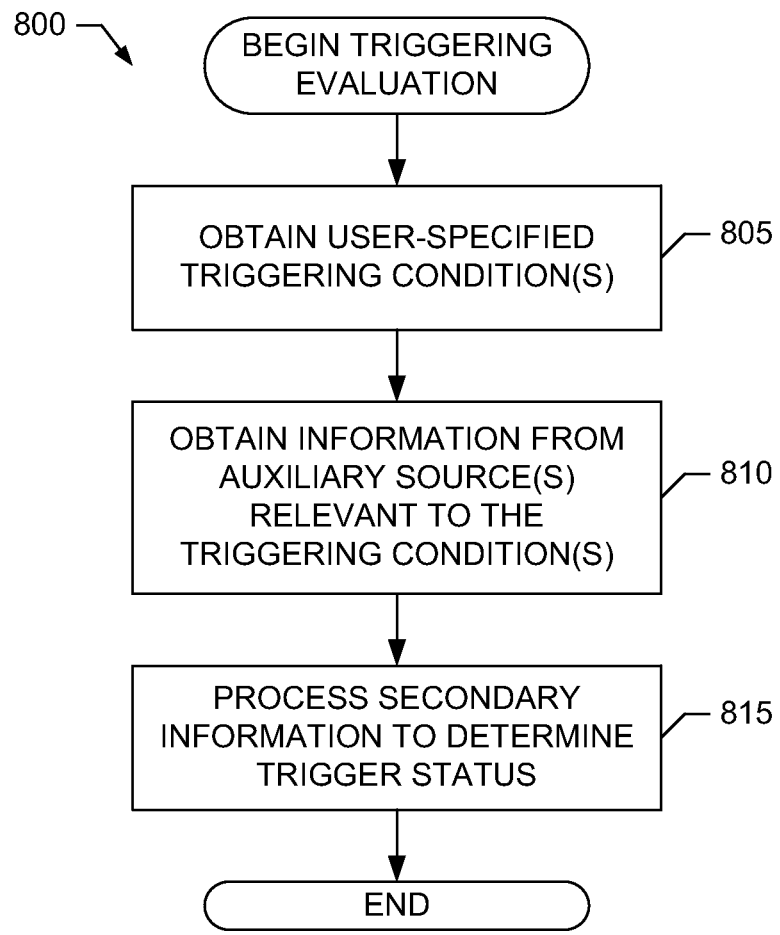
FIG. 8 is a flowchart representative of example machine readable instructions that may be executed to implement trigger evaluation processing in the example content filter of FIG. 2.

Example machine readable instructions 800 that may be executed to implement the example trigger condition evaluator 240 of the example content filter 130 of FIG. 2 are represented by the flowchart shown in FIG. 8. For convenience, and without loss of generality, execution of the machine readable instructions 800 is described in the context of evaluating user-specified preference triggering condition(s) associated with the user device 105A of FIG. 1. With reference to the preceding figures and associated descriptions, the machine readable instructions 800 of FIG. 8 begin execution at block 805 at which the trigger condition evaluator 240 obtains one or more user-specified preference trigger conditions associated with the user device 105A (and which may be specific to the user device 105A), which are to be used to determine whether to trigger one or more user-specified content restriction preference(s) for filtering the incoming data to be routed to the user device 105A. At block 810, the trigger condition evaluator 240 obtains, from one or more auxiliary sources, information relevant to evaluating the trigger conditions, as described above. At block 815, the trigger condition evaluator 240 processes the auxiliary information obtained at block 815 to determine a trigger status (e.g., active, inactive, etc.) associated with each trigger condition. As described above, the trigger status for each trigger condition is used by the content filter 130 to determine whether user-specified content restriction preference(s) associated with the trigger condition(s) are to be activated and used for content filtering, or are to remain inactive and not be used for content filtering.

Figure 9:
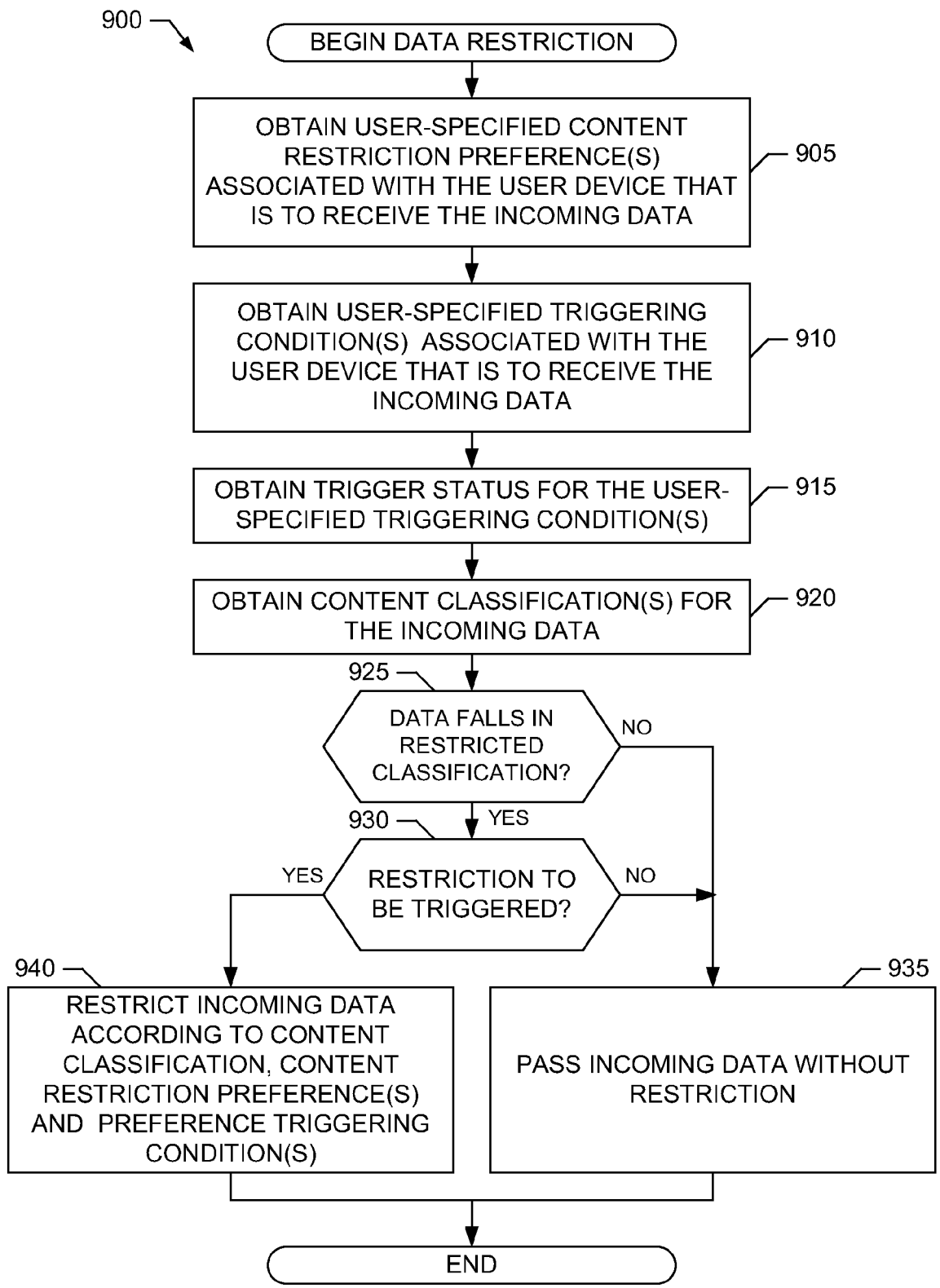
FIG. 9 is a flowchart representative of example machine readable instructions that may be executed to implement data restriction processing in the example content filter of FIG. 2.

Example machine readable instructions 900 that may be executed to implement the example data restrictor 235 of the example content filter 130 of FIG. 2 are represented by the flowchart shown in FIG. 9. For convenience, and without loss of generality, execution of the machine readable instructions 900 is described in the context of processing incoming data associated with the user device 105A of FIG. 1. With reference to the preceding figures and associated descriptions, the machine readable instructions 900 of FIG. 9 begin execution at block 905 at which the data restrictor 235 obtains (e.g., from preference retriever 230) the user-specified content restriction preference(s) associated with the user device 105A, which is to receive the incoming data provided to the content filter 130 for processing. At block 910, the data restrictor 235 obtains (e.g., from preference retriever 230) any preference triggering condition(s) associated with the user-specified content restriction preference(s) obtained at block 905 for the user device 105A. At block 915, the data restrictor 235 obtains (e.g., from the trigger condition evaluator 240) the trigger status of the triggering condition(s). At block 920, the data restrictor 235 obtains (e.g., from the content classifier 215, and/or from tag(s) appended to and/or included with the incoming data) the content classification(s) for the incoming data.

At block 925, the data restrictor 235 compares the content classification(s) for the incoming data with the user-specified content restriction preference(s) to determine whether some (e.g., a portion) or all of the incoming data falls into a content classification (or combination of classifications) that is to be restricted from being routed to the user device 105A. If the incoming data falls into a restricted content classification (or a restricted combination of classifications) (block 925), then at block 930, the data restrictor 235 evaluates the trigger status for the relevant content restriction preferences to determine whether the restriction is to be triggered. If the restriction is not to be triggered (block 930), or the data is not to be restricted (block 925), then processing proceeds to block 935 at which the data restrictor 235 indicates that the incoming data is to be passed (e.g., with modification) to the routing network 125 for routing to the user device 105A.

However, if the restriction is to be triggered (block 930), then processing proceeds to block 940 at which the data restrictor 235 restricts the incoming data (or the portion of the incoming data) that falls into the restricted content classification (or the restricted combination of classifications) from being routed to the user device 105A. For example, the data restrictor 235 may restrict all of the incoming data from being provided to the routing network 125 if all of the incoming data falls into the restricted content classification (or the restricted combination of classifications) specified by the user. In another example, the data restrictor 235 may restrict a first portion of the incoming data (e.g., such as unrequested data provided by a secondary content source 115B, and possibly meeting one or more other content restriction preferences)

from being provided to the routing network 125, but may permit a second portion of the incoming data (e.g., such as requested data provided by a primary content source 115A) to be provided to the routing network 125 for routing to the user device 105A.

Figure 10:
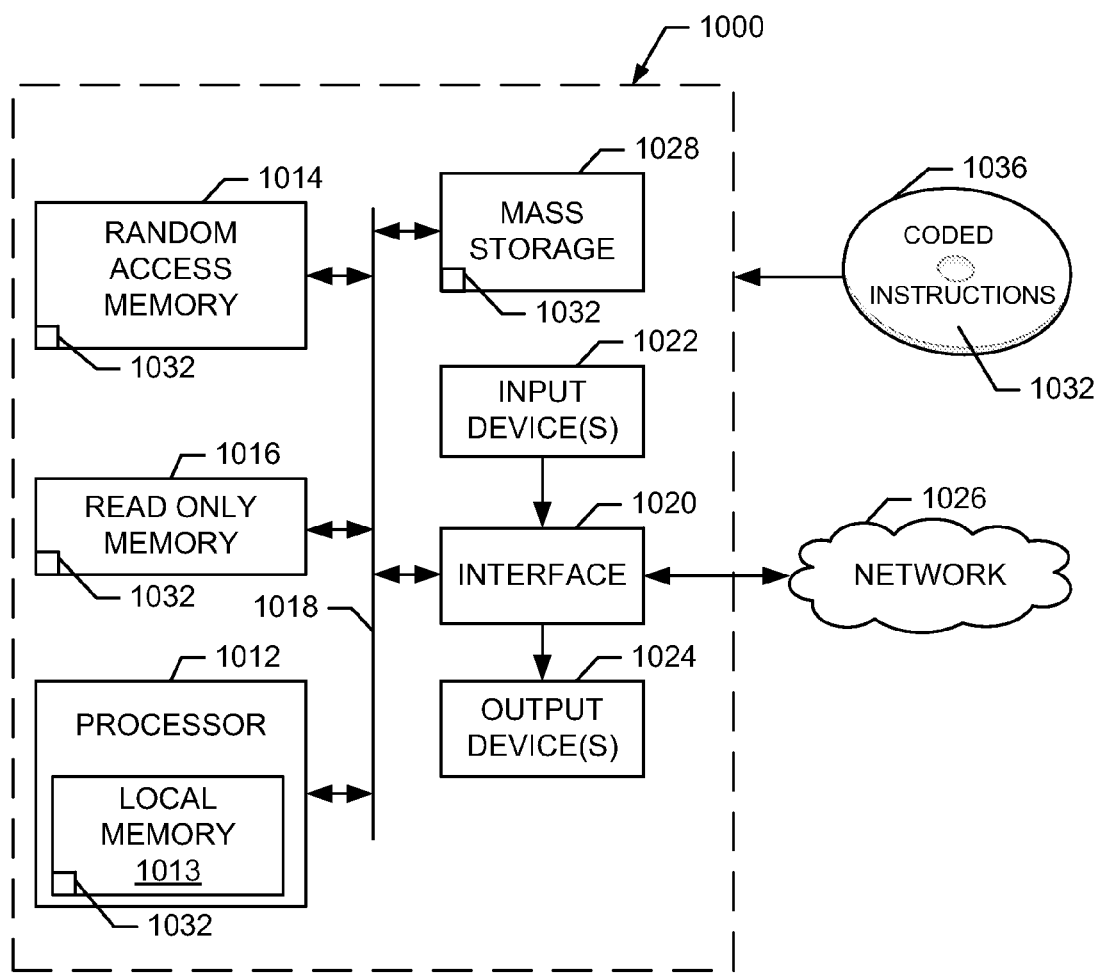
FIG. 10 is a block diagram of an example processing system that may execute the example machine readable instructions of FIGS. 3-8 and/or 9 to implement the example content filter of FIG. 2 and/or the example communication system of FIG. 1.

In some examples, the processing at block 925 and 930 may be reordered and/or modified such that only those content restriction preferences associated with trigger conditions having an active or otherwise satisfactory status are evaluated to determine whether the incoming data falls into one or more restricted content categories or combinations of categories FIG. 10 is a block diagram of an example processing system 1000 capable of executing the instructions of FIGS. 3-9 to implement the example content filter 130, the example data categorizer 205, the example data category storage 210, the example content classifier 215, the example profile specifier 220, the example profile storage 225, the example preference retriever 230, the example data restrictor 235 and/or the example trigger condition evaluator 240 of FIGS. 1-2. The processing system 1000 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1000 of the instant example includes a processor 1012. For example, the processor 1012 can be implemented by one or more microprocessors and/or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processing system 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, a trackbar (such as an isopoint), a voice recognition system and/or any other human-machine interface.

One or more output devices 1024 are also connected to the interface circuit 1020. The output devices 1024 can be implemented, for example, by display devices (e.g., a liquid crystal display, a cathode ray tube display (CRT)), a printer and/or speakers. The interface circuit 1020, thus, typically includes a graphics driver card.

The interface circuit 1020 also includes a communication device, such as a modem or network interface card, to facilitate exchange of data with external computers via a network 1026 (e.g., an Ethernet connection, a digital subscriber line (DSL), a telephone line, coaxial cable, a cellular telephone system, etc.).

The processing system 1000 also includes one or more mass storage devices 1028 for storing machine readable instructions and data. Examples of such mass storage devices 1028 include floppy disk drives, hard drive disks, compact disk drives and digital versatile disk (DVD) drives.

Coded instructions 1032 corresponding to the instructions of FIGS. 3-9 may be stored in the mass storage device 1028, in the volatile memory 1014, in the non-volatile memory 1016, in the local memory 1013 and/or on a removable storage medium, such as a CD or DVD 1036.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to perform network-based content filtering, the method comprising:

receiving, at an incoming edge router of a provider network, incoming data to be routed in the provider network to a destination device;

selecting, at the incoming edge router and based on device identification information included in the incoming data, a first profile associated with the destination device from a plurality of profiles including different content restriction preferences specified for respective different devices, the first profile including a first content restriction preference to be used to determine whether to restrict routing of the incoming data to the destination device;

before routing the incoming data in the provider network, determining whether to activate the first content restriction preference based on a first triggering condition different from the first content restriction preference and corresponding to a characteristic of a first service plan associated with the destination device; and in response to determining the first triggering condition is satisfied, activating the first content restriction preference to restrict the routing of the incoming data in the provider network to the destination device, the first content restriction preference being related to a content classification of the incoming data.

2. The method of claim 1, wherein the first content restriction preference identifies a content category to be restricted from being routed to the destination device.

3. The method of claim 2, wherein the content category includes at least one of a content type, a data type, a source type, a data size range, a bandwidth range and a quality of service.

4. The method of claim 1, wherein the first triggering condition is specified in the first profile.

5. The method of claim 1, wherein the first triggering condition includes at least one of an amount of time remaining in a billing cycle of the first service plan, and a time of day associated with increased access charges according to the first service plan.

6. The method of claim 1, wherein the incoming data is received in response to a request from the destination device, the incoming data includes first data provided by a first source to which the request was directed and second data provided by a second source to which the request was not directed, and further including:

preventing the second data from being routed to the destination device based on the first content restriction preference; and routing the first data to the destination device.

7. The method of claim 1, wherein the first content restriction preference specifies a first bandwidth range that, when consumed by the incoming data, is to cause the incoming edge router to restrict routing of the incoming data in the provider network to the destination device.

8. A tangible machine readable medium comprising machine readable instructions which, when executed, cause an edge router of a provider network to perform operations comprising:

selecting, based on device identification information included in incoming data received at the edge router, a first profile, which is associated with a destination device to which the incoming data is to be routed, the first profile selected from a plurality of profiles including different content restriction preferences specified for respective different devices, the first profile including a first content restriction preference to be used to determine whether to restrict routing of the incoming data to the destination device;

before the incoming data undergoes routing in the provider network, determining whether to activate the first content restriction preference based on a first triggering condition different from the first content restriction preference and corresponding to a characteristic of a first service plan associated with the destination device; and in response to determining the first triggering condition is satisfied, activating the first content restriction preference to restrict the routing of the incoming data in the provider network to the destination device, the first content restriction preference being related to a content classification of the incoming data.

9. The tangible machine readable medium of claim 8, wherein the first content restriction preference identifies a content category to be restricted from being routed to the destination device.

10. The tangible machine readable medium of claim 9, wherein the content category includes at least one of a content type, a data type, a source type, a data size range, a bandwidth range and a quality of service.

11. The tangible machine readable medium of claim 8, wherein the first triggering condition is specified in the first profile.

12. The tangible machine readable medium of claim 8, wherein the first triggering condition includes at least one of an amount of time remaining in a billing cycle of the first service plan, and a time of day associated with increased access charges according to the first service plan.

13. the tangible machine readable medium of claim 8, wherein the first content restriction preference specifies a first bandwidth range that, when consumed by the incoming data, is to cause the edge router to restrict routing of the incoming data in the provider network to the destination device.

14. An apparatus to perform network-based content filtering, the apparatus comprising:

memory including machine readable instructions; and a processor responsive to the machine readable instructions to perform operations including:

retrieving, based on device identification information included in incoming data, a first profile, which is associated with a destination device to which the incoming data is to be routed, the first profile being one of a plurality of profiles including different content restriction preferences specified for respective different devices, the first profile including a first content restriction preference to be used to determine whether to restrict routing of the incoming data to the destination device, the first content restriction preference being related to a content classification of the incoming data;

prior to the incoming data being routed to the destination device, determining whether to activate the first content restriction preference based on a first triggering condition different from the first content restriction preference and corresponding to a characteristic of a first service plan associated with the destination device; and in response to determining the first triggering condition is satisfied, activating the first content restriction preference to filter the incoming data.

15. The apparatus of claim 14, wherein the first content restriction preference identifies a content category to be restricted from being routed to the destination device.

16. The apparatus of claim 15, wherein the content category includes at least one of a content type, a data type, a source type, a data size range, a bandwidth range and a quality of service.

17. The apparatus of claim 15, wherein the first profile includes a second content restriction preference identifying a second content category to be restricted from being routed to the destination device.

18. The apparatus of claim 14, wherein the first profile specifies the first triggering condition.

19. The apparatus of claim 14, wherein the first triggering condition includes at least one of an amount of time remaining in a billing cycle of the first service plan, and a time of day associated with increased access charges according to the first service plan.

20. The apparatus of claim 14, wherein the first content restriction preference specifies a first bandwidth range that, when consumed by the incoming data, is to cause the routing of the incoming data in the provider network to the destination device to be restricted.

* * * * *